United States Patent [19]

Lupoli et al.

[11] Patent Number: 4,899,263
[45] Date of Patent: Feb. 6, 1990

[54] LAMP FIXTURE FOR ILLUMINATING INTERIOR OF CIGAR LIGHTER SOCKET

[75] Inventors: Peter J. Lupoli, Hamden; Donald J. Mattis, Norwalk; Robert S. Miller, Stratford, all of Conn.

[73] Assignee: Casco Products Corporation, Bridgeport, Conn.

[21] Appl. No.: 667,559

[22] Filed: Nov. 2, 1984

[51] Int. Cl.$^4$ ............................................. B60Q 3/04
[52] U.S. Cl. ........................................ 362/80; 362/365
[58] Field of Search ................. 362/80, 365, 100, 364, 362/368, 374, 375, 376, 378, 457, 319, 437, 433, 277, 320, 322, 282; 248/27.3; 339/14 R, 17 D, 128, 44 M, 217 S

[56] References Cited

U.S. PATENT DOCUMENTS

| | | | |
|---|---|---|---|
| 1,976,362 | 10/1934 | Nielsen | 339/14 R |
| 2,144,376 | 1/1939 | Johnson | 362/80 |
| 2,419,950 | 5/1947 | Johnson | 362/365 |
| 2,506,181 | 5/1950 | Thibault | 362/80 |
| 2,692,938 | 10/1954 | Cone | 362/80 |
| 2,741,747 | 4/1956 | Woofter | 339/128 |
| 2,953,769 | 9/1960 | Woofter et al. | 339/17 D |
| 3,050,705 | 8/1962 | Benson | 339/17 D |
| 3,118,717 | 1/1964 | Horan | 339/128 |
| 3,125,299 | 3/1964 | Woofter et al. | 339/128 |
| 3,473,015 | 10/1969 | Haas et al. | 339/128 |
| 3,737,656 | 6/1973 | Plana | 362/365 |
| 3,775,728 | 11/1973 | Pitacco | 339/14 R |
| 3,975,619 | 8/1976 | Uda | 362/80 |
| 4,166,887 | 7/1979 | Van Buren | 362/365 |
| 4,213,665 | 7/1980 | Murray et al. | 339/17 D |
| 4,342,074 | 7/1982 | Bull et al. | 362/365 |
| 4,398,240 | 8/1983 | Savage | 362/363 |
| 4,471,414 | 9/1984 | Savage | 362/363 |

Primary Examiner—Charles J. Myhre
Attorney, Agent, or Firm—Mitchell D. Bittman

[57] ABSTRACT

A one-piece molded plastic lamp fixture for mounting a light bulb at the exterior of the clamping shell portion of an electric cigar lighter for vehicles, to provide illumination of the socket thereof. The clamping shell has a light-admitting aperture over which the bulb is positioned when carried in a body part of the plastic fixutre. An integral plastic hood is connected to the body part adjacent the bulb, and can be swung from a first position overlying and generally concealing the bulb, to a second position wherein the bulb is exposed for replacement. The body and hood portions are joined by a living hinge, and the body portion is held on the clamping shell by resilient, opposed integral retainer fingers that are receivable in openings in the shell. The hood portion has integral ears which underlie and back up the retainer fingers when the hood is swung to its first position whereby inward movement of the fingers is limited to prevent the fixture from becoming inadvertently loosened from the clamping shell. The hood and body portions, and hinge can all be molded as a single integral plastic or nylon piece.

27 Claims, 3 Drawing Sheets

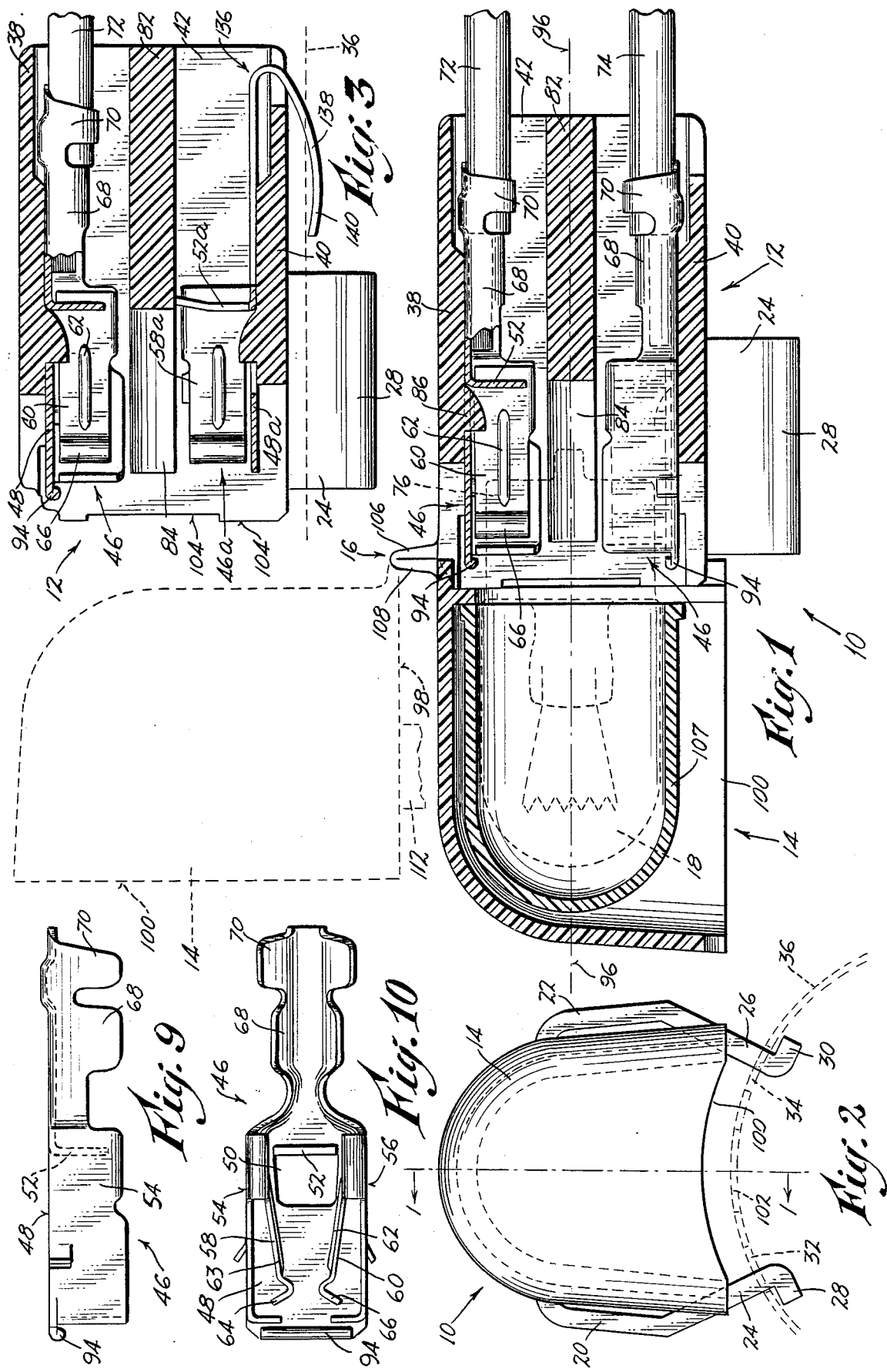

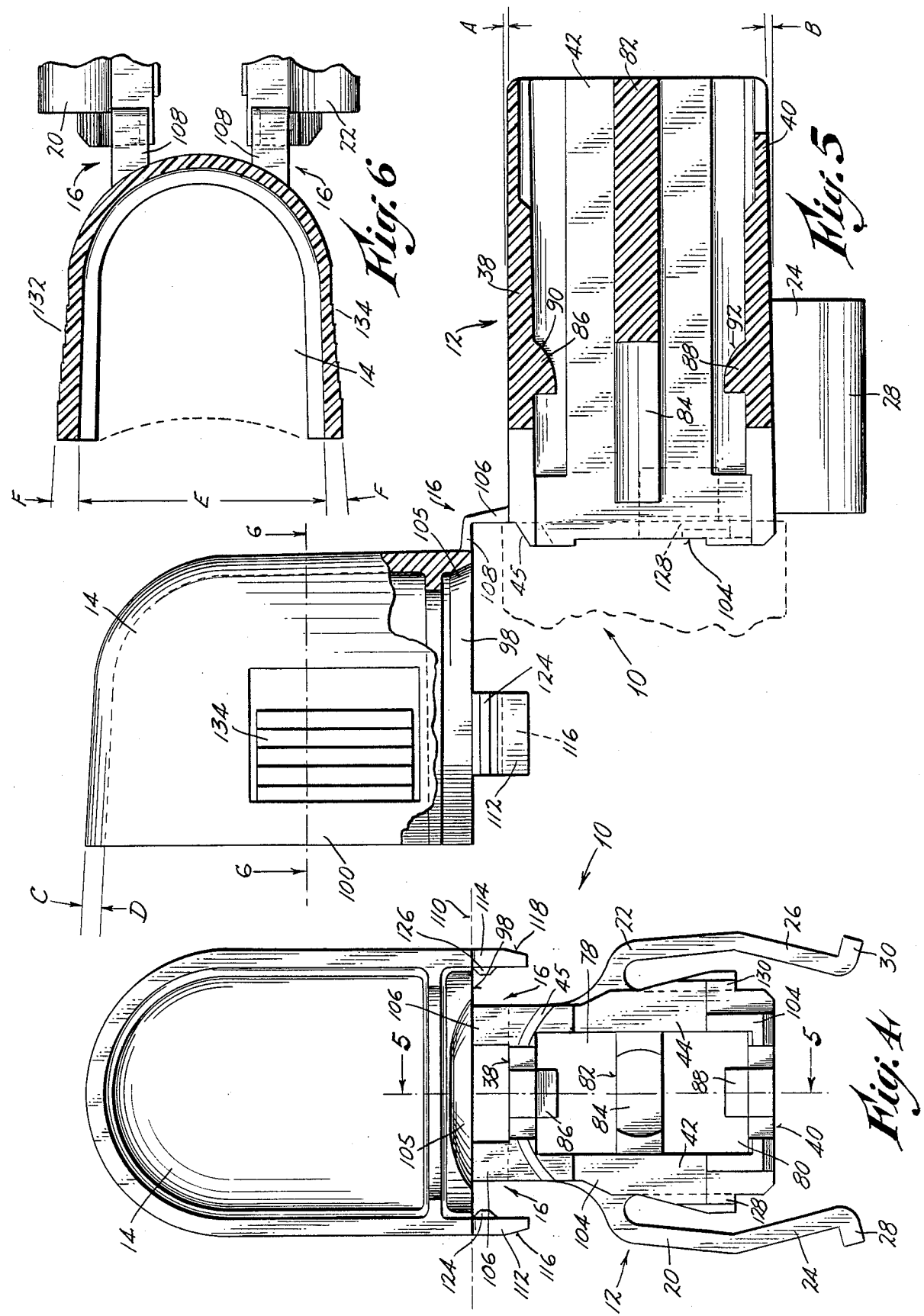

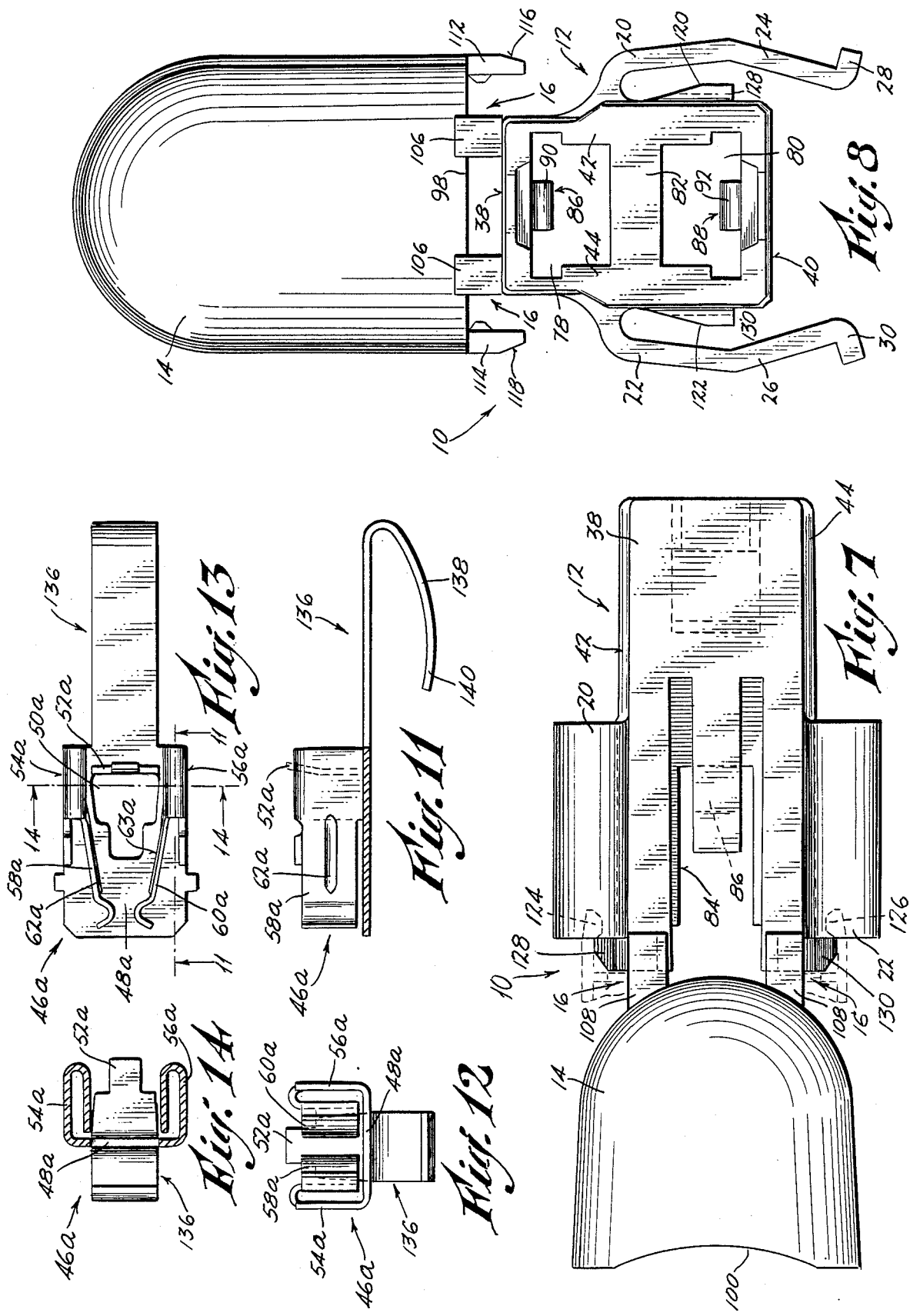

LAMP FIXTURE FOR ILLUMINATING INTERIOR OF CIGAR LIGHTER SOCKET

BACKGROUND

This invention relates generally to cigar lighter devices, and more particularly to devices of the type which incorporate a lighting assemblage at the exterior of the cigar lighter socket in order to provide illumination of the interior thereof, under conditions of darkness. The illumination of the socket facilitates proper replacement of the ignitor plug of the cigar lighter in such cases, thereby minimizing hazards associated with burns to personnel in the vehicle, fire, etc.

In present day automobiles, the wells of cigar lighter sockets have outturned front flanges and are secured in place by means of clamp shells which are installed from the rear of the dashboard or other panel carrying the lighter. The clamp shells are normally screwed in place on the threaded inner end of the socket well.

Where illumination has been provided, there are usually a series of apertures in the clamp shell, which are intended to admit light and allow it to pass through corresponding apertures in the side wall of the well such that light from an external fixture carried on the shell could pass into the interior of the socket. In some cases, the apertures in the side wall were intended to align with those of the clamp shell, whereas in other constructions there was adequate light reflection off the inner surface of the shell even if such alignment did not occur.

A typical installation is illustrated in co-pending application U.S. Ser. No. 497,094 filed May 23, 1983, entitled MULTI-PIECE CLAMPING SHELL FOR ELECTRIC CIGAR LIGHTERS, in the names of Peter J. Lupoli and John J. Comerford, and having common ownership with the present case, now U.S. Pat. No. 4,527,048.

In FIG. 1 of the prior application there is illustrated an all metal housing or hood structure, which has oppositely-disposed retainer fingers that snap into corresponding slots in the outer clamp shell of the lighter, at the rear of the dashboard or panel where the lighter is located. The clamp shell and socket have aligned openings which permit light from the filament of the bulb to pass therethrough, and into the socket interior. The metal housing is provided with a retainer slot, and a conventional plastic lamp socket can be snapped into position in the hood; typically such bulb sockets have one or more external positioning lugs which locate the socket in the desired manner. The socket has two leads extending axially from its end, to provide the necessary electrical connections to the bulb.

While the above construction has enjoyed acceptance over the years, it has been found that installation of such devices is sometimes difficult to achieve, since it is necessary that the fingers of the hood have sufficient resilience to hold the fixture in position, after the installer releases them. Sometimes installation was made more difficult by virtue of cramped space, or in other instances where accessibility was limited. In the event that the bulb later burned out or otherwise failed as a result of vibration for example, replacement was sometimes difficult. Also, the fact that two additional electrical leads were required made the wiring harnesses in the vehicle more complex. The leads supplying the bulb were in addition to those running to the cigar lighter itself. Where plastic panels have been employed, it has been necessary to provide two separate leads to the cigar lighter unit, one being the "hot" lead, and the other being a ground return. Ground return leads generally were constituted as separate wires having spade lugs at their ends, the lugs mating with cooperable spade connectors that were usually welded to the clamp shell of the device.

SUMMARY

The above drawbacks and disadvantages of prior lamp fixtures for electric cigar lighters are largely obviated by the present invention, which has for one object the provision of a novel and improved lamp fixture which is extremely simple in its construction while at the same time being rugged and providing reliable operation over extended periods of use.

A related object of the invention is to provide an improved lamp fixture as above set forth, wherein both installation and replacement of the lamp is greatly facilitated, and can be accomplished without the use of special tools, by unskilled personnel.

Still another object of the invention is to provide an improved lamp fixture as above characterized, which can be fabricated almost entirely of plastic, and wherein the plastic parts can be constituted as a single integral piece, molded in one mold. As a result the overall manufacturing cost is significantly reduced, since no separate stampings are required for the housing, and problems with rust or corrosion are eliminated.

Yet another object of the invention is to provide an improved lamp fixture of the kind indicated, wherein a locking arrangement between a pivotal hood and a carrier body insures that the latter does not loosen and inadvertently become detached from the cigar lighter socket.

A still further object of the invention is to provide an improved lamp fixture as outlined above, wherein the need for a second, insulated-wire type ground return for the lamp can be eliminated, thus greatly simplifying the nature of the electrical connections required at the rear of the lighter socket.

Still another object of the invention is to provide an improved lamp fixture as characterized above, wherein no separate molded plastic socket is required for the bulb. Instead, relatively simple stamped metal contact strips can be incorporated in special recesses in a single molded plastic part, so as to enable both a quick electrical connection to the bulb and a good mechanical support thereto.

The above objects are accomplished by the provision of a one-piece resilient plastic lamp unit for attachment to the socket of an electric cigar lighter for automobiles, comprising a receptacle body portion having means for supporting a lamp thereon, a hood portion adjacent the body portion, the hood portion having open sides to accept the lamp, and a living hinge that is integral with both the body portion and the hood portion. The hinge is joined to the hood portion substantially at an edge which borders one of its open sides, and is joined to the body portion at an exterior surface thereof. The one open side of the hood portion is spanned by an exterior surface of the body portion, such that the hood and body portions essentially constitute continuations of each other when the hood portion is enclosing a lamp supported by the body portion. The other of the open sides of the hood portion constitutes a window through which light rays from the lamp can pass when the hood portion is enclosing the lamp.

The objects are further accomplished by a resilient plastic lamp unit for attachment to an electric cigar lighter for automobiles or other vehicles, wherein the lighter is of the type having a socket with a side wall and a light-admitting aperture in the side wall, the lamp unit comprising a receptacle body portion having means for supporting a lamp thereon, resilient finger means on the body portion adapted to be received in recesses in the socket side wall and to releasably retain the body portion in a generally stationary position thereon, a hood portion disposed adjacent the body portion, and living hinge means integral with and connecting the hood and body portions to each other. The hinge means enables the hood portion to pivot from a first, in-line position overlying the lamp, to a second, raised position wherein the lamp is exposed, whereby the hood portion can be raised and the lamp replaced by another unit, and thereafter the hood portion again swung to the said first, in-line position, overlying the replaced lamp. The hood portion has an opening in one side through which the lamp can extend when the hood portion is disposed in its first, in-line position, and an opening in a second side, constituting a window through which light from the lamp can pass to the light-admitting aperture in the side wall of the cigar lighter socket, for illuminating the interior thereof. The hood portion, body portion and living hinge means are all molded integral with one another so as to minimize manufacturing costs.

Other features and advantages will hereinafter appear.

In the drawings, illustrating several embodiments of the invention:

FIG. 1 is an axial sectional view of the improved lamp unit of the present invention, particularly illustrating the body portion, the hood portion, the integral living hinge connecting the two portions to enable the hood portion to be swung to a raised position with respect to the body portion, and the lamp that is carried on the body portion in a position wherein it can be made accessible for replacement by raising the pivoted hood portion. The section is on line 1—1 of FIG. 2.

FIG. 2 is a left end elevation of the lamp unit of FIG. 1, showing the hood portion, and a pair of resilient clip arms disposed on the body portion. Also shown in dotted outline is the wall of the cigar lighter socket, having openings to receive the ends of the resilient clip arms.

FIG. 3 is a vertical section of a modified body portion for use with the lamp unit of FIG. 1, wherein a spring contact finger is employed for effecting one of the electrical connections to the lamp, as opposed to the cable or lead wire shown in FIG. 1, this construction constituting another embodiment of the invention. In this arrangement, it is presumed that the clamp shell is maintained at electrical ground potential by virtue of its contact with a metal dashboard or metal ashtray, so as to provide a complete path for current flow.

FIG. 4 is a left end elevational view of the lamp unit of FIG. 1 but with the lamp removed and showing the underside of the hood portion of the lamp unit with the hood portion swung upwardly and out of line with the body portion.

FIG. 5 is a part elevation, part section, the section being taken on the line 5—5 of FIG. 4.

FIG. 6 is a fragmentary section taken on the line 6—6 of FIG. 5.

FIG. 7 is a top plan view of the lamp unit of FIG. 1, with the hood swung upwardly to a position corresponding to that shown in dotted outline in FIG. 1.

FIG. 8 is a right end elevational view of the lamp unit of FIG. 1.

FIG. 9 is a side elevational view of a spring metal clip of the type employed in the lamp unit of FIG. 1, and adapted for engagement by one terminal of an incandescent lamp or bulb.

FIG. 10 is a top plan view of the spring metal clip of FIG. 9.

FIG. 11 is a side elevational view of a spring metal clip of the type employed in the body portion of the lamp unit of FIG. 3, this clip having an external resilient contact finger which is disposed exteriorly of the body portion and which is adapted for pressure contact with the outer surface of the cigar lighter socket, so as to establish one electrical connection to the lamp.

FIG. 12 is a left end elevation of the spring clip of FIG. 11.

FIG. 13 is a top plan view of the clip of FIG. 11.

FIG. 14 is a section taken on the line 14—14 of FIG. 13.

Referring to FIG. 1 and in accordance with the present invention there is illustrated a novel and improved one-piece, resilient plastic lamp unit for illuminating the interior of a cigar lighter socket of an automobile or other conveyance, the unit being designated generally by the numeral 10. The unit 10 comprises a body portion 12, a hood portion 14 and a living hinge 16 joining the two parts such that the hood portion 14 can be swung from a first, lowered or in-line position shown in solid outline in FIG. 1, o a second, raised position shown in dotted outline in the figure, in order to provide accessibility for replacement of the incandescent lamp or bulb 18. The living hinge 16 is referred to in some of the appended claims as a hinge means, and can be constituted as a pair of spaced-apart webs as particularly shown in FIGS. 4 and 6–8. The webs are generally parallel to one another. Alternately a single, central hinge could be employed. The hinge 16 is integral with both the hood portion 14 and the body portion 12.

The body portion 12 has a pair of oppositely disposed resilient clip arms 20, 22, FIGS. 2 and 4, the arms having angular portions 24, 26 respectively, and further having divergent end portions 28, 30 which are adapted to be received in openings or slits 32, 34 in the outer wall of a cigar lighter socket assembly. The assembly is indicated in dotted outline in FIG. 2, and designated 36. The part 36 is a clamp shell portion of the assembly, that is, the cylindrical sleeve which surrounds the cigar lighter well and which mounts the well at the desired location in the dashboard or panel where the lighter is to be located. The arms 20, 22 are both resilient, and the resiliency lends an outwardly directed biasing force to the ends 28, 30 such that the body portion 12 can be initially positioned by merely momentarily squeezing the arms together, inserting the ends in the openings 32, 34, and releasing the arms. The body portion 12 will be held in position by the divergent ends 28, 30 which are seated below the edges of the respective openings 32, 34 in the part 36.

Referring again to FIGS. 4 and 5, the body portion 12 has a generally rectangular tubular configuration, comprising a top wall 38, bottom wall 40, and side walls 42 and 44. As shown, the arms 20, 22 are integral with side walls 42 and 44 respectively, and are joined thereto at their upper portions. This arrangement enables the arms to have a substantial length, and there is thus maximized the ability of the ends to flex as the body portion is positioned on the socket part 36. A relieved area on the body portion 12, in the form of a chamfer 45 (FIGS. 4 and 5) is provided, in order to clear the hood portion 14 when the latter is lowered as will be explained below.

In FIG. 1, electrical connection to the lamp 18 is made by means of two identical spring metal clips, one of which is shown in FIGS. 9 and 10 and designated 46. The lamp 18 is preferably of a type which is constituted as a sealed glass envelope containing the filament, and having an integral flat, slab-like glass base with a pair of conductive lead wires emanating from the base and having multiple reverse bends across the bottom of the base such that at least a portion of each wire overlies opposite faces of the flat base. The arrangement is such that the wires can be engaged by pressure terminals such as the spring clip 46 shown in FIGS. 9 and 10.

The spring metal clips 46 comprise a main portion or yoke 48 having a slot 50 formed by punching out a tooth 52, a pair of oppositely-disposed legs 54, 56 extending from one side of the yoke, and a pair of opposed spring fingers 58, 60 carried by and integral with the legs 54, 56, respectively, and also located at one side of the yoke, for receiving and engaging the respective lamp terminals. Each of the fingers 58, 60 can have longitudinal stiffening ribs 62, 63 respectively and divergent ends 64, 66 respectively which provide a lead-in formation for the base of the lamp 18 when the latter is installed in the body portion 12.

In the construction illustrated in FIG. 1, there are two such spring clips 46 employed, one for each terminal of the lamp 18. At the extremities of the clips 46 are wrap-around retainer lugs 68, 70 of usual construction, the lugs 68 being intended to crimp an electrical lead 72 or 74, and the lug 70 being intended to wrap around the insulation of the respective lead, and provide stiffening between the spring clip and lead.

In FIG. 1, the base of the lamp 18 is indicated in dotted outline by the numeral 76, and as noted above has a generally flat configuration, being relatively thin with respect to its width. The thin dimension is intended to be received between the fingers 58, 60, as can be readily understood.

As shown in FIGS. 1 and 8, the interior of the body portion 12 is hollow, having two longitudinal passages 78, 80 which respectively receive the two spring clips 46 and their associated electrical leads 72, 74. In use, the clips are secured to the leads first, and then inserted into the body portion 12. A longitudinal wall 82 extends for part of the length of the body portion 12. There is optionally a relieved area 84, providing adequate clearance space to receive the base of the particular lamp 18 that is intended to be employed.

By the present invention means are provided on the body portion 12 and spring clips 46 for locking the latter in an operative position following initial installation of the clips in the respective passages 78 or 80, the means comprising a pair of sloped locking lugs 86, 88, FIG. 5, having camming faces 90, 92 respectively which are intended to be engaged by the leading edges 94 of the spring clips 46. As the spring clips are inserted, the slots 50 of each clip arrive at the respective lugs 86, 88, and the latter become seated. Due to the relatively flat faces of the lugs 86, 88 that are opposite to the camming surfaces, the spring clips remain locked in position in the body portion, and cannot work loose under normal forces applied to the leads 72, 74.

By the present invention the axes of the body portion 12, hood portion 14 and lamp 18 are coincidental, lying along the dotted line 96 in FIG. 1 when the hood portion 14 occupies a first, in-line position as shown. In this position, the hood portion 14 overlies and generally conceals the lamp 18. In addition, by the present invention the hood portion 14 has open sides 98, 100, the opening in the side 98 constituting a clearance space through which the bulbous body of the lamp 18 can extend when the hood is in line. The remaining open side 100 constitutes a window through which light rays from the lamp 18 can pass. The rays then are intended to pass through a light-admitting opening 102 (FIG. 2) in the socket part 36, and into the socket interior (not labelled). When closed, the side 98 of the hood portion 14 is spanned by a side or exterior surface 104 (FIGS. 4 and 5) of the body portion 12. The hinge 16 is joined to the hood portion 14 at an edge which borders one of the openings 98, and to the the body portion at an edge of the exterior surface 104. The hood and body portions have outer curved surfaces which constitute continuations of each other when the hood portion 14 is disposed in the position of FIG. 1. The interior surface of the hood portion 14 has a chamfer 105, FIG. 4, which clears the chamfer 45 and closely overlies it when the hood portion is disposed in the in-line position.

As particularly shown in FIG. 1, there is sufficient clearance space between the lamp 18 and inner surface of the hood 14 such that the lamp can optionally be fitted with a tubular sleeve 107, preferably constituted of a rubber elastomer, which is transparent and be characterized by different colors. Where such a sleeve was employed, there would be imparted to the light emanating from the lamp different shades, in order to provide a softer glow than the relatively harsh yellow produced by a conventional incandescent lamp.

In FIG. 1, the hinge 16 has a leg 106 which is laterally offset with respect to the top wall 38 of the body portion of the lamp unit, a second leg 108 which is laterally offset with respect to the outer surface of the hood portion 14, with the junction between these laterally offset portions 106 and 108 constituting the axis 110 of the hinge. The particular arrangement involving the offset portions is significant in that it permits both the body and hood portions, as well as the hinge, to be molded as a single integral plastic or nylon part. In this connection it is noted that when the molding is carried out the relative positions of the body portion 12 and hood portion 14 are as indicated in FIG. 5, whereby the molded plastic piece can be readily stripped from the mold parts, following curing of the piece. Without the particular configuration of the offset portions 106 and 108 of the hinge 16, it would be considerably more difficult to mold the unit as a single piece. It is believed that problems could occur with interference with the mold parts, and that stripping from the molds could be more troublesome than is the case with the present arrangement. Accordingly it is believed that this construction constitutes an important feature of the present invention.

In addition, as particularly shown in FIG. 5 the body part 12 is provided with a taper in its outer surface, defining small, but finite angles greater than zero degrees, which facilitate removal of a mold part (not shown) from the cured plastic. These angles are indicated by the sets of arrows labelled "A" and "B", respectively. Also, the hood portion 14, FIG. 5, is provided with a sloping outer wall, having a finite, taper angle greater than zero degrees with respect to the horizontal in this figure, the angle being indicated by the letter "C". The inner wall also has a small but finite taper, defining an angle indicated by the letter "D", which is greater than zero degrees with respect to the horizontal. Similar tapers defining small but finite, greater-than-zero angles with respect to the horizontal, in FIG. 6, are also provided on the side walls of the hood portion 14, these being labelled "E" and "F". These "draft" angles permit the body and hood portions to be readily pulled from cavities in a single mold when the axis of the hood portion 14 is at an angle of roughly 90° with respect to the axis of the body portion 12.

Further, in accordance with the invention, cooperable means are provided on the body and hood portions for locking the spring arms 20, 22 respectively in position in the openings 32 and 34 of the socket part 36, after the hood portion 14 is swung to its first, in-line position. The locking means comprises a pair of depending ears 112 and 114, FIG. 4, that are integral with the remainder of the hood portion 14, the ears having tapered lead-in surfaces 116 and 118 respectively. After the body portion 12 has been assembled to the clamp shell part 36, with the fingers 20, 22 extending into the openings 32, 34 respectively and with the lamp installed, the hood portion 14 is swung from the raised position shown in dotted outline in FIG. 1 to the in-line position, and the ears 112 and 114 engage and spread the fingers 20 and 22 and maintain an outwardly directed pressure against them. In effect, the ears 112 and 114 fill the spaces or "holes" between the fingers 20, 22 and the walls 42, 44. Thus, the force of the fingers against the walls of the openings 32 and 34 is maintained, and the retention of the body portion 12 on the part 36 is improved since it is not possible to squeeze the fingers together once the hood is lowered. It has been found that with such an arrangement, the possibility of the body portion 12 loosening from the part 36 is almost eliminated as a result of the back-up effect on the fingers 20, 22.

Also in accordance with the present invention, detent and positioning structures are provided on the body portion 12 and hood portion 14, such that when the latter is lowered to its in-line position, FIGS. 1 and 2, the structures engage one another and retain the hood portion 14 in this in-line position. In accomplishing the retention there are provided on the inner surface of the hood portion 14 a pair of elongate projecting lugs 124, 126, FIG. 4, which by-pass cooperable abutments 128, 130, FIG. 4, on the outer surfaces of walls 42 and 44, respectively. The lugs 124 and 126 both have beveled leading and trailing surfaces as shown. In addition, the abutments have a beveled front surface, but a sharp rear surface, FIG. 7. As can be readily understood, the leading beveled surface on each lug 124, 126, facilitates its by-pass of the corresponding beveled surfaces of the abutments 128, 130, respectively as the hood 14 is being swung to its in-line position. The lugs 124 and 126 and abutments 128, 130 thus operate to prevent the hood portion from inadvertently being bumped or jarred open, and exposing the lamp 18.

In FIGS. 5 and 6, the opposite faces of the hood portion 14 are provided with a ribbed configuration, indicated 132 and 134, which facilitate gripping of the hood portion by the fingers of the user, during installation of a bulb, or replacement thereof, etc.

Yet another embodiment of the invention is illustrated in FIGS. 3 and 11–14. Similar numerals have been assigned to parts which are essentially duplicate structures of those indicated in the construction of the figures discussed previously.

In FIG. 3, a modified spring clip 46a has been provided, which establishes electrical connection to one of the terminals of the lamp and eliminates the need for a separate electrical lead similar to that indicated in FIG. 1 by the numeral 74. The modified spring clip comprises a one-piece stamping having a yoke portion 48a, a slot 50a formed by stamping out a tooth 52a, a pair of legs 54a and 56a, and spring fingers 58a and 60a. Stiffening ribs 62a, 63a are also optionally provided.

In place of the clamping lugs 68 and 70 of FIGS. 9 and 10, by the present invention there is provided a resilient, reverse-bend contact strip or contact shoe 136 which is intended to bear with moderate pressure against the cylindrical outer, electrically grounded surface of the socket part 36. This part is shown in dotted outline in FIG. 3, and the strip is illustrated in the position it would occupy prior to its engagement with the socket part 36. The strip 136 extends exteriorly of the body portion 12, and has an exteriorly-facing contactor segment or contact area 138 which is preferably somewhat bowed, and disposed at a level which is below the level of the yoke 48a. In addition the strip has an end 140 which converges toward the wall 40. This configuration minimizes the likelihood of the strip 136 being snagged or caught on other parts or components during handling or installation. In some of the appended claims this strip is referred to as a resilient contact arm.

In addition to the strip 136, the tooth 52a has been extended in length such that it bears against the wall 82, for support. Thus, pressure applied to the finger 136 is, at least partially, countered by the force of the wall 82 acting on the end of the tooth 52a, as in FIG. 3.

By such an arrangement the need for the second electrical lead 74 is eliminated, and only the single lead 72 required. Considerable simplification of the wiring harness associated with the cigar lighter and its lamp unit results. This construction also insures that a good contact pressure is maintained between the finger 136 and the outer surface of the clamp shell, such that the integrity of the electrical path to the lamp does not become jeopardized. In addition the design shown in FIG. 3 has been found to be more economical from the manufacturing standpoint. Moreover, there is less chance for error and less likelihood of malfunctioning, since fewer separate wires are involved.

From the above it can be seen that we have provided novel and improved lamp units for illuminating the interior of cigar lighter sockets, the devices being both simple in their structure and economical to manufacture. The provision of a single plastic part represents a distinct economy over prior devices of this type. Installation is straightforward, as are operations involving replacement of the lamp. Simple snap-in type spring clips can be employed, requiring little assembly time, and no special tooling or mechanical skill.

The devices are thus seen to represent a distinct advance and improvement in the technology of cigar lighter devices.

Each and every one of the appended claims defines an aspect of the invention which is separate and distinct from all others, and accordingly each claim is to be treated in this manner when examined in the light of the prior art devices in any determination of novelty or validity.

Variations and modifications are possible without departing from the spirit of the invention.

What is claimed is:

1. A one-piece resilient plastic lamp unit for attachment to the socket of an electric cigar lighter for automobiles and other conveyances, comprising in combination:
   (a) a receptacle body portion having means for supporting a lamp at one exterior surface thereof,
   (b) a hood portion disposed adjacent the said exterior surface of the body portion, said hood portion having open sides to provide for the passage of said lamp thereinto, and
   (c) a "living" hinge integral with and connecting said body and hood portions to each other,
   (d) said hinge being joined to the hood portion at an edge thereof which borders one of its open sides, and being joined to said body portion at an edge of said exterior surface thereof,
   (e) said one open side of the hood portion being spanned by the exterior surface of the body portion, and said hood and body portions essentially constituting continuations of each other when the hood portion is enclosing a lamp supported by the body portion,
   (f) another of the open sides of said hood portion constituting a window through which light rays from the lamp can pass when the hood portion is enclosing the lamp.

2. The invention as defined in claim 1, wherein:
   (a) the hood and body portions have axes which are roughly coincidental with the axis of a supported lamp when the hood portion encloses the latter,
   (b) said hood and body portions having molded surfaces characterized by draft angles permitting said portions to be readily pulled from cavities in a single mold when the axis of the hood portion is at an angle of roughly 90° with respect to the axis of the body portion.

3. The invention as defined in claim 1, wherein:
   (a) the hood and body portions have axes which are roughly coincidental with the axis of a supported lamp when the hood portion encloses the latter, and
   (b) cooperable yieldable detent means on the hood and body portions, for yieldably retaining the hood portion in a position wherein its axis is aligned with the axis of the body portion.

4. The invention as defined in claim 1, wherein:
   (a) the hood and body portions have axes which are roughly coincidental with the axis of a supported lamp when the hood portion encloses the latter,
   (b) means for supporting the body portion on the cigar lighter socket, said immediately-preceding means comprising resilient clip arms on said body portion, receivable in openings of the socket, and
   (c) locking means on the hood portion, engageable with said resilient clip arms to restrict the yielding thereof so as to lock the body portion in its operative position on the socket.

5. The invention as defined in claim 1, wherein:
   (a) the means for supporting the lamp comprises a spring-metal clip adapted to engage a terminal of the lamp,
   (b) said spring-metal clip having a resilient contact shoe which is exposed exteriorly of the body portion and is adapted for engagement with the exterior of the cigar lighter socket to make electrical contact therewith.

6. The invention as defined in claim 1, wherein:
   (a) said body portion has spaced-apart side walls and bottom and top walls joined to said side walls,
   (b) said means for supporting the body portion on the cigar lighter socket comprising integral molded clip arms joined to the side walls of the body portion at locations spaced upward from the bottom wall thereof.

7. The invention as defined in claim 4, wherein:
   (a) said body portion has tapered land surfaces spaced from said clip arms and engageable with said locking means, to provide a reinforcing backing therefor.

8. A resilient plastic lamp unit for attachment to the socket of an electric cigar lighter for automobiles or other vehicles, said lighter being of the type having a socket with a side wall and a light-admitting aperture in said side wall, the lamp unit comprising in combination:
   (a) a receptacle body portion having means for supporting a lamp thereon,
   (b) resilient finger means on the body portion adapted to be received in a recess in the socket side wall, and to releasably retain the body portion in a generally stationary position there-on,
   (c) a hood portion being disposed adjacent the body portion,
   (d) living hinge means integral with and connecting said body and hood portions to each other,
   (e) connector means carried by said body portion for making electrical connections to the lamp,
   (f) said hinge means enabling the hood portion to pivot from a first, in-line position overlying the lamp, to a second raised position wherein the lamp is exposed, whereby the hood portion can be raised and the lamp replaced by another lamp, and thereafter the hood portion swung to the said first position overlying the said replacement lamp,
   (g) said hood portion having an opening in one side through which the lamp can extend when the hood portion is disposed in its first, in-line position, and having an opening in a second side, constituting a window through which light from the lamp can pass to the light-admitting aperture in the side wall of the cigar lighter socket, for illuminating the interior of the socket,
   (h) said hood portion, body portion nd living hinge means being molded integral with one another so as to minimize manufacturing costs.

9. The invention as defined in claim 8, wherein:
   (a) said hinge means comprises a pair of coextensive, spaced-apart and generally parallel webs connecting the said hood and body portions of the lamp unit to each other.

10. The invention as defined in claim 8, and further including:
    (a) cooperable means on said body and hood portions, for releasably retaining the latter i its first, in-line position, overlying the lamp.

11. The invention as defined in claim 8, wherein:
    (a) the hood portion when disposed in its first, in-line position with respect to the body portion, together with the body portion, form a generally continuous curved surface at the exterior of the lamp unit.

12. The invention as defined in claim 8, wherein:

(a) said resilient finger means includes two resilient fingers on the body portion, adapted to be received in two recesses in the socket side wall, and to releasably retain the body portion of the lamp unit thereon, (b) said fingers having divergent end portions, and the resilience of the fingers biasing the said end portions apart and maintaining the said retention.

13. The invention as defined in claim 8, wherein:

(a) said connector means comprises a spring finger carried by the body portion and having an external slide portion extending outside of the body portion and adapted to engage the exterior surface of the cigar lighter socket and thus establish an electrical connection from the socket to the said lamp.

14. The invention as defined in claim 8, wherein:

(a) said hinge means is characterized by a pair of offsetting arm portions which are joined at their extremities, the junction constituting the axis of the hinge, (b) said offsetting arm portions folding essentially completely back upon and overlying one another when the hood portion occupies its first, in-line position.

15. The invention as defined in claim 14, wherein:

(a) both of said offsetting arm portions extend above the top wall of the body portion when the hood portion occupies its first, in-line position.

16. The invention as defined in claim 14, wherein:

(a) both of said offsetting arm portions extend above the top wall of the hood portion when the latter occupies its first, in-line position.

17. A resilient plastic lamp unit for attachment to the socket of an electric cigar lighter for automobiles or other vehicles, said lighter being of the type having a socket with a side wall and a light-admitting aperture in said side wall, the lamp unit comprising in combination:

(a) a receptacle body portion having means for supporting a lamp thereon, (b) means for releasably retaining the body portion on the socket side wall, (c) a hood portion disposed adjacent the body portion, (d) a hinge connecting the body and hood portions for pivotal movement of the latter between a first in-line position overlying the lamp and a second, raised position wherein the lamp is exposed, whereby the hood portion can be raised and the lamp replaced, and (e) cooperable abutment structures on the hood and body portions, for locking the releasable retaining means of the body portion, and preventing inadvertent release of the body portion from the said socket side wall.

18. The invention as defined in claim 17, wherein:

(a) said releasable retaining means on the body portion comprises a yieldable plastic retainer finger receivable in an aperture in the side wall of the socket, (b) said abutment structures comprising an ear carried by said hood portion, adapted to underlie and back-up the said yieldable retainer finger so as to prevent inward movement thereof and inadvertent release of the body portion from the socket side wall.

19. The invention as defined in claim 17, wherein:

(a) said releasable retaining means on the body portion comprises a pair of yieldable plastic retainer fingers receivable in apertures in the side wall of the socket, (b) said abutment structures comprising a pair of ears carried by said hood portion, adapted to underlie and back up said yieldable retainer fingers respectively so as to prevent inward movement thereof and inadvertent release of the body portion from the socket side wall.

20. The invention as defined in claim 18, wherein:

(a) said ear has a tapered leading edge to facilitate its positioning underneath the retainer finger as the hood portion is moved from its second, raised position toward its first, in-line position with respect to the body portion.

21. A lamp unit for attachment to the socket of an electric cigar lighter for automobiles or other vehicles, said lighter being of the type having a socket with a side wall and a light-admitting aperture in said side wall, the lamp unit comprising in combination:

(a) a one-piece molded plastic receptacle having means for supporting a lamp thereon, (b) means for releasably retaining the receptacle on the exterior of a cigar lighter socket side wall with the lamp positioned adjacent to the light-admitting aperture thereof, (c) an electrical contact carried in the receptacle, for engagement by one terminal of the lamp when the latter is installed, thereby establishing one electrical connection for the lamp, (d) a second electrical contact carried in the receptacle, for engagement by the other terminal of the lamp, and (e) external spring finger means extending outside the walls of the receptacle, said spring finger means being resilient and integral with said second electrical contact, and said spring finger means being so disposed as to extend between the outside wall of the receptacle and the cigar lighter socket and having a pressure surface adapted for abutting frictional engagement with and electrical contact with the exterior surface of the cigar lighter socket, thereby to establish the other electrical connection for the lamp.

22. The invention as defined in claim 21, wherein:

(a) said plastic receptacle has a passage for receiving the second electrical contact, (b) said second electrical contact having an upstanding resilient projection for engagement with the wall of the passage, to provide support for the contact therein.

23. The invention as defined in claim 22, wherein:

(a) said second contact comprises a sheet metal body, (b) said projection comprising a tooth struck from the contact body.

24. A lamp unit for attachment to metal sockets of electric cigar lighters for automotive vehicles, comprising in combination:

(a) a casing constituted of plastic substance and having means for mechanically securing it at one side of the said socket, (b) a lamp carried in said casing, (c) said lamp having two electrical terminals, (d) means carried by said casing for making electrical contact with one of said lamp terminals, said means being adapted for connection to one side of the vehicle's electrical system, (e) a metal electrical receptacle having a contact shoe, carried by said casing for making electrical contact with the other lamp terminal, said metal receptacle including a main portion having a U-shaped cross section comprising a yoke located at one level and oppositely-disposed upstanding legs on said yoke, extending upward from said level, including a pair of opposed spring fingers carried by and integral with said legs and disposed at the upper side of said yoke for receiving and engaging opposite sides of the other lamp terminal, and including a resilient contact arm carried by said yoke and constituting said contact shoe, (f) said contact shoe being disposed exteriorly of said plastic casing and having an exteriorly-facing contactor segment extending downwardly from the level of said yoke, the resilience of said shoe being capable of biasing said segment into mechanical engagement and electrical contact with a metal socket of a cigar lighter, thereby to establish an electrical connection to the socket from the second lamp terminal.

25. The invention as defined in claim 24, wherein:
(a) said contact arm is doubled back on itself,
(b) the contact segment being disposed adjacent the arm extremity.

26. The invention as defined in claim 24, wherein:
(a) said metal receptacle and contact shoe are integral with one another.

27. The invention as defined in claim 24, wherein:
(a) said yoke has a slot in it, and wherein
(b) said plastic casing has a passage for receiving the receptacle,
(c) said passage having a sloped locking lug, adapted to be received in said slot to lock the metal receptacle to the casing.

* * * * *